May 11, 1965

E. A. SACK, JR 3,183,452

MULTIVIBRATOR USING ELECTROLUMINESCENT-PHOTOCONDUCTIVE
CONTROL ELEMENTS

Original Filed Dec. 17, 1959

WITNESSES
Edwin E. Bassler
James F. Young

INVENTOR
Edgar A. Sack, Jr.
BY Ernest P. Klipfel
ATTORNEY

May 11, 1965  E. A. SACK, JR  3,183,452
MULTIVIBRATOR USING ELECTROLUMINESCENT-PHOTOCONDUCTIVE
CONTROL ELEMENTS
Original Filed Dec. 17, 1959  3 Sheets-Sheet 2

United States Patent Office 3,183,452
Patented May 11, 1965

3,183,452
MULTIVIBRATOR USING ELECTROLUMINESCENT-PHOTOCONDUCTIVE CONTROL ELEMENTS
Edgar A. Sack, Jr., Penn Township, Allegheny County, Pa., assignor to Westinghouse Electric Corporation, East Pittsburgh, Pa., a corporation of Pennsylvania
Original application Dec. 17, 1959, Ser. No. 860,177. Divided and this application Sept. 18, 1961, Ser. No. 139,339
7 Claims. (Cl. 331—107)

This invention relates to control apparatus in general and in particular to control apparatus utilizing solid state control elements.

This application is a division of application Serial No. 860,177, filed December 17, 1959, now abandoned.

The ideal non-mechanical relay has yet to be invented. Such a device should combine certain of the very desirable characteristics of an electromechanical contactor with the reliability and speed of the all-electric "switch." An improved electric relay should possess the following characteristics. Load "contacts" should constitute a true switch whose conduction is independent of the polarity, amplitude, frequency, phase, and waveform of the load voltage, current, or power. Load contacts should exhibit a very high ratio of "closed" to "open" conductivity. In general, "closed" conductivity should approach infinity and "open" conductivity should approach zero. Electrical isolation between the load and control terminals should be very high. Load contacts should be capable of handling many times the power required to actuate the relay. The relay should be capable of fast response to the application of the control signal. This relay device should have a long life and a high reliability. The device should also be small, rugged, and light in weight. For the relay device to find maximum application, it should have the ability to respond to a variety of control signals.

The conventional gaseous, vacuum and non-mechanical relays and switches fall short of meeting all of these specifications. The transistor, thyratron and vacuum tube are not truly bidirectional switches. In general, in order to use these devices as relays, it is necessary to introduce a carrier which, when added to the signal to be passed, maintains overall unidirectional polarity. It is often necessary to separate the signal from the bias before the desired information can be passed on to some other portion of the circuit. This can lead to considerable complication when a direct current level is inherent in the signal itself and its identity must be retained.

In certain types of "relays," such as the magnetic amplifier, the carrier is an alternating rather than a direct potential. Again, the use of such a switching means immediately introduces the problem of separating the signal from the carrier.

Although, presently available non-mechanical "relays" should exhibit satisfactory ratios of "closed" to "open" conductivity, the impedance level of the device may be inconvenient in certain applications. For example, the vacuum tube is not generally suitable where the switch must control high currents at low voltage levels.

One of the most serious deficiencies of conventional all-electric relays is the lack of isolation between the load and control terminals. Typically, one load terminal and one control terminal are common when the vacuum tube is used as a relay. In a transistor, both of the control terminals are affected by conditions in the load circuit.

In accordance with the above discussion, an ideal control apparatus or amplifier which regulates an output to a load over a predetermined range also has yet to be invented. Such a control apparatus would also need to combine the desirable characteristics of the electromechanical and all-electric devices detailed hereinbefore.

It is, accordingly, an object of this invention to provide improved control apparatus.

It is an object of this invention to provide improved control apparatus having bilateral switching characteristics wherein the load "contacts" exhibit a high ratio of "closed" to "open" conductivity.

A further object of this invention is to provide improved control apparatus which may function as a switching means.

A still further object of this invention is to provide improved control apparatus which may function as an amplifier.

It is an object of this invention to provide improved control apparatus having a long life and requiring no maintenance, that is small, rugged, easy to fabricate, and light in weight.

Other objects of this invention will become apparent from the following description when taken in conjunction with the accompanying drawings. In said drawings, for illustrative purposes only, are shown preferred embodiments of the invention.

Figure 1:
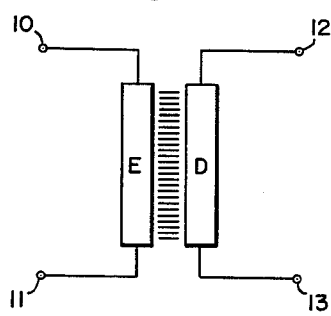
FIGURE 1 is a diagram illustrating a solid state control element utilized in this invention.

Referring to FIG. 1, there is illustrated the solid state control element used in the embodiments of this invention. Element E is an electroradiative transducer. The application of a potential to a pair of control terminals 10 and 11, causing a passage of current through this element E, generates a radiation which is guided to or focused on element D. Element D is radiation-sensitive. The radiation from element E causes the electrical impedance characteristics of the element D to vary at a pair of load terminals 12 and 13.

The exact geometry of the configuration illustrated in FIG. 1 will depend upon the materials to be used, the desired impedance levels in the load and control circuits, the power to be handled by the radiation-sensitive element D, etc. If the areas of the element E and the element D are significantly different, a lens may be included in order to optimize the transfer of the radiant energy. Although the variation of the electrical characteristics of the element D is referred to hereinafter as a fall in resistance it is to be understood that all impedance variations of radiation-sensitive transducers which will control current flow in a load are included.

Figure 2:
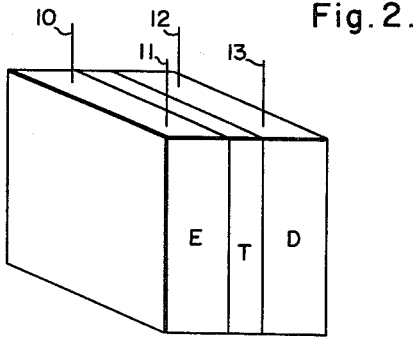
FIG. 2 is a perspective view of an embodiment of the control element shown in FIG. 1.

Referring to FIG. 2, there is illustrated a perspective view of an embodiment of the solid state control element illustrated in FIG. 1. The element E, in this case, may be an electroluminescent cell, alternating-current or direct-current, while the element D may be a photoconductor. The layer T between the electroluminescent cell E and the photoconductor D may be any suitable transparent insulator. The device is to be encapsulated in a container which is impervious to ambient radiation which would affect the performance of element D and which has either terminals or leads on the encapsulated device for the control terminals 10 and 11 and the load terminals 12 and 13.

To facilitate the description of the following embodiments, the electroradiative element E will be divided into two types. Type I will be an element in which the instantaneous intensity of the output radiation may be considered as varying with the instantaneous amplitude of the applied potential or current. Cadmium, sulfide or silicon carbide crystals are examples of Type I electroluminescent emitters. A direct-current electroluminescent cell would be classified as Type I. Type II will be an element in which the average intensity of the output radiation may be considered as varying with the amplitude of an applied carrier potential. Zinc sulfide, copper activated, is an example of Type II electroluminescent emitter. An alternating-current electroluminescent material is here classified as Type II.

The radiation-sensitive transducers may also be divided into two types or modes of operation. In Type A, the electric characteristics are assumed to vary with the instantaneous intensity of the incident radiation. The electrical characteristics of a Type B material, however, follow the average amplitude of the incident radiation over some time interval. Cadmium sulfide, lead sulfide, cadmium selenide and zinc tellanide are examples of Type A radiation detectors. The same materials as Type A may be used for Type B except input radiation varies too fast for the detectors to follow instantaneously and, instead responds to average radiation.

Figure 3:
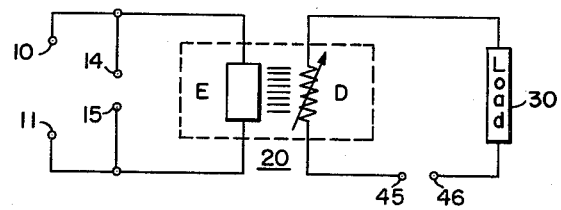
FIG. 3 is a schematic diagram of a basic control or amplifier circuit embodying the teachings of this invention.

Referring to FIG. 3, there is illustrated a schematic diagram of a basic control or amplifier circuit, utilizing the solid state control element hereinbefore discussed, embodying the teachings of this invention. In FIG. 3 the solid state element 20 is illustrated symbolically with E symbolizing an electroradiative transducer or emitter and D symbolizing a radiation sensitive transducer or detector. The emitter E of the control element 20 is connected in series circuit relationship between the terminals 10 and 11. The detector D is connected in series circuit relationship with a load 30 and a pair of terminals 45 and 46.

In operation, if the emitter E is Type I and the detector D is Type A, then the signal to be applied to the terminals 10 and 11 is a direct-current. The power supply to be connected to the terminals 45 and 46 may be either an alternating or a direct-current. The magnitude of the direct-current control signal applied to the terminals 10 and 11 varies the flow of power from the terminals 45 and 46 through the load 30. An increase in the magnitude of the signal applied to the terminals 10 and 11 increases the amount of radiation from the emitter E of the control element 20. This radiation varies the impedance of the detector D of the control element 20 allowing more power to flow from the terminals 45 and 46 through the load 30. If the detector D is a photoconductive cell, the resistance will be lowered. Other types of detectors will vary their internal impedance in accordance with the amount of radiation received.

If the emitter E of the control element 20 is Type II the "signal" applied to the terminals 10 and 11 is a modulated carrier. The flow of power to the load 30 now varies directly with the amplitude of the applied carrier to the terminals 10 and 11. Again, the power supplied to the load 30 from the terminals 45 and 46 may be either alternating-current or direct-current.

If so desired, a bias potential or current may be applied to the terminals 14 and 15 connected in parallel with the signal terminals 10 and 11 to bias the emitter E to some level of radiation or excitation. With proper coupling of the input signal circuit to the terminals 10 and 11, the bias potential or current may be applied to the emitter E in series with the emitter E and between the terminals 10 and 11. Whether the bias is alternating or direct-current voltage depends upon whether the emitter E is Type II or Type I, respectively.

It is to be noted that the apparatus illustrated in FIG. 3 may be used in two distinct modes. In a switching mode the detector D of the control element 20 is either conducting or non-conducting. That is, the electrical input signal when applied to the terminals 10 and 11 will be of sufficient magnitude to excite the emitter E to radiate or "switch" the detector D into full conduction. The switching mode is analogous to the operation of a true relay or switch. In a control mode the detector D will vary its impedance in a substantially continuous manner in accordance with the magnitude of the electrical input signal applied to the terminals 10 and 11 which excites the emitter E. The control mode is analogous to the operation of an amplifier.

Figure 4:
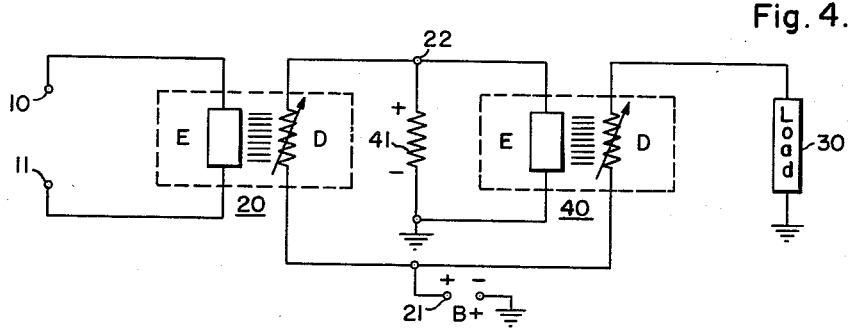
FIG. 4 is a schematic diagram of a second embodiment of the teachings of this invention.

Referring to FIG. 4 there is illustrated a schematic diagram of two cascaded Type I–A control element amplifiers embodying the teachings of this invention. In general, the apparatus illustrated in FIG. 4 comprises means for applying an input signal at the terminals 10 and 11, an input stage control element 20 having an emitter E and a detector D, a coupling resistor 41, an output stage control element 40 having an emitter E and a detector D, means for connecting a load 30 and means for applying a direct-current supply.

The emitter E of the control element 20 is connected in series circuit relationship between the terminals 10 and 11. The detector D of the control element 20 is connected in series circuit relation between a terminal 21 and a terminal 22. The coupling resistor 41 and the emitter E of the control element 40 are connected in parallel circuit relationship between the terminal 22 and ground. The detector D of the control element 40 is connected in series circuit relationship with a load 30 between the terminal 21 and ground. A suitable source of direct current is to be connected, with polarity as shown, between the terminal 21 and ground.

The operation of each of the control elements 20 and 40 is similar to the operation of the control element 20 in FIG. 3. Upon application of a direct current signal to the terminals 10 and 11 the emitter E of the control element 20 starts emitting radiation to the detector D of the control element 20. Upon receipt of radiation the resistance of the detector D of the control element 20 will fall, allowing a current flow from the terminal 21 through the detector D of the control element 20, the terminal 22 and the resistor 41 to ground. A voltage drop, with polarity as shown, across the resistor 41 will cause the emitter E of the control element 40 to start radiating the detector D of the control element 40. The resistance of the detector D of the control element 40 falls, allowing current flow from the terminal 21 through the detector D of the control element 40 and the load 30 to ground.

Several stages of control elements may be connected in the above-described manner utilizing a common direct-current source supply as shown in FIG. 4, although separate direct current supplies may be used.

Figure 5:
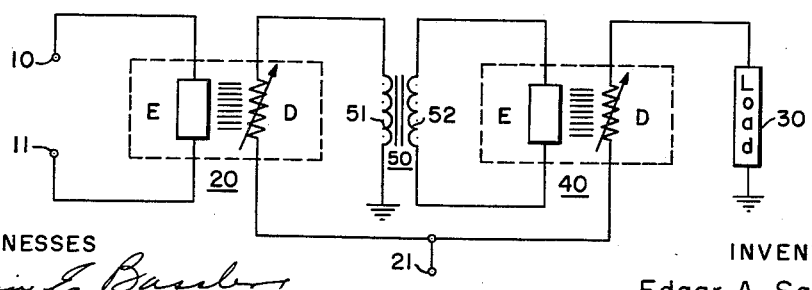
FIG. 5 is a schematic diagram illustrating a third embodiment of the teachings of this invention.

Referring to FIG. 5, there is illustrated a schematic diagram of two cascaded Type II–B control elements, embodying the teachings of this invention in which like elements of the FIGS. 4 and 5 have been given the same reference characters. The main distinction between the apparatus illustrated in FIGS. 4 and 5 is that in FIG. 5 the coupling transformer 50 has been substituted for the coupling resistor 41 of FIG. 4 since a carrier is to be applied between the terminal 21 and ground instead of a suitable source of direct-current. The detector D of the control element 29 is now in series relationship with the primary winding 51 of the transformer 50 between the terminal 21 and ground. The emitter E of the control element 40 is now in series circuit relationship with the secondary winding 52 of the transformer 50.

In operation an alternating-current signal is to be applied to the terminals 10 and 11 causing the emitter E of the control element 20 to emit radiation to the detector D of the control element 20. The resistance of the detector D of the control element 20 will fall with an increase in the amplitude of the carrier signal applied to the terminals 10 and 11 and will allow current flow from the terminal 21 through the detector D of the control element and the primary winding 51 of the transformer 50 to ground and a first half-cycle, and in the reverse direction on the next half-cycle, of the carrier connected between the terminal 21 and ground. A voltage will be induced in the secondary winding 52 of the transformer 50 which causes the emitter E of the control element 40 to emit radiation to the detector D of the control element 40 allowing a current flow from the terminal 21 through the detector D of the control element 40 and the load 30 to ground. On the next half-cycle of the carrier connected between the terminal 21 and ground current will flow in a reverse direction through the load 30 and the detector D of the control element 40 to the terminal 21. A number of stages of the Type II-B control elements may be cascaded in the manner shown in FIG. 5. The various stages of FIG. 5 may also be driven from separate carrier supplied instead of the one connected between the terminal 21 and ground.

In cascading the Type I-A, Type II-A, Type I-B and Type II-B there are a number of different coupling arrangements that may be used between stages depending upon the type of signal received from the preceding stage. By proper design, coupling networks between stages may be eliminated entirely. The cascaded control elements may be used in either the switching or amplifying modes as described hereinbefore.

If bias is desired in any or all of the plurality of stages of the apparatus illustrated in FIGS. 4 and 5, it may be applied, as described for the apparatus illustrated in FIG. 3, in the emitter circuit of any stage.

Figure 6:
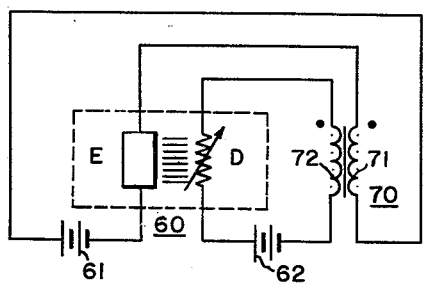
FIG. 6 is a schematic diagram illustrating a fourth embodiment of the teachings of this invention.

Referring to FIG. 6, there is illustrated a schematic diagram of a feedback oscillator, using a Type I-A control element, embodying the teachings of this invention. Since the amplifiers hereinbefore discussed can deliver a power gain, the output of a single stage can be fed back into the input of that stage with such a phase and amplitude as to result in oscillation. In the apparatus illustrated in FIG. 6, an emitter E of a control element 60 is connected in series circuit relationship with a first winding 71 of a transformer 70 and a first source of direct current 61. A detector D of the control element 60 is connected in series circuit relationship with a second winding 72 of the saturating transformer 70 and a second direct current source 62.

When the direct current sources 61 and 62 are first connected to the circuit of FIG. 6, there will be no potential applied to the emitter E of the control element 60 until the saturable reactor 70 saturates. That is, the winding 71 of the saturable reactor 70 supports the voltage applied by the direct current source 61 until the saturable reactor 70 reaches negative saturation. Upon saturation of the saturable reactor 70, the winding 71 approximates virtually zero impedance and the entire potential of the direct current source 61 is now across the emitter E of the control element 60. The emitter E starts to radiate the detector D of the control element 60. The resistance of the detector D of the control element 60 starts to fall and the winding 72 of the saturable reactor 70 now supports the voltage supplied by the direct source 62.

During the period that the saturable reactor 70 is being driven to positive saturation by the ampere-turns applied by the direct current source 62, there is a voltage induced in the winding 71 of the saturable reactor 70 of such polarity as to said the direct current source 61 in applying a potential to the emitter E of the control element 60. Thus, the emitter E is now supplying more radiation to the detector D of the control element 60 and further lowering the resistance of the detector D. Upon positive saturation of the saturable reactor 70, the field provided by the induced voltage in winding 71 of the saturable reactor 70 collapses, opposing the potential provided by the direct current source 61. This reduces the potential applied to the emitter E and thus the radiation supplied to the detector D. Therefore, when the resistance of the detector D goes up, current in the winding 72 will start decreasing and the field in the winding 72 starts collapsing which induces a current in winding 71 further opposing the direct current source 61. This again reduces the radiation to D driving its resistance higher and the action follows through until the emitter E stops radiating to the detector D and the cycle starts all over again.

The apparatus illustrated in FIG. 6 will also oscillate if transformer 70 is a simple transformer and not a saturable reactor. Since the solid state control element 60 acts as an amplifier then if the output is connected to the input in a regenerative manner, the device will oscillate. The direct current source 61 must be sufficiently large that the voltage across the emitter E of the control element 60 remains unidirectional.

Assume that the potential across the emitter E is increasing. Since the control element 60 is an amplifier the voltage across the winding 72 will be increasing and be larger in magnitude than the potential across the emitter E. Therefore, the induced voltage appearing across the winding 71 will reinforce the original increasing potential across the emitter E. This reinforcement will continue until the voltage across winding 72 reaches the value of the direct current source 62 or until some component in the circuit tends to saturate. The transformer 70 cannot sustain a non-changing potential across the winding 71. Hence the voltage across the winding 71 drops, the potential across the emitter E drops and the direction of oscillation reverses.

Figure 7:
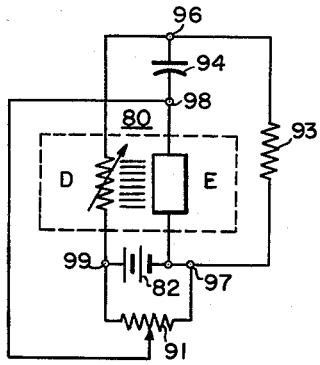
FIG. 7 is a schematic diagram illustrating a fifth embodiment of the teachings of this invention.

Referring to FIG. 7, there is illustrated a schematic diagram of another form of an oscillator, utilizing the solid state control element 80, embodying the teachings of this invention. A direct current source 82 with polarity as shown is connected between the emitter E and the detector D of the control element 80 to the terminals 97 and 99, respectively. An adjustable tapped resistor 91 is connected between the terminals 97 and 99. A resistor 93, terminal 96 and a coupling capacitor 94 are connected in series circuit relationship between the terminal 97 and a terminal 98 on the other end of the emitter E of the control element 80. The tap of the adjustable tapped resistor 91 is connected to the terminal 98. The detector D of the control element 80 is connected in series circuit relationship between the terminals 99 and 96.

The tapped resistor 91 is set so that the potential across the emitter E remains unidirectional. Assume that the potential across the emitter E is increasing. Since the control element 80 is an amplifier then the voltage across the resistor 93 is increasing and may be larger than the potential across the emitter E.

The increase in voltage across the resistor 93 is coupled over to the emitter E by the capacitor 94 and reinforces the original increasing potential across the emitter E. This reinforcement action continues until the voltage across the resistor 93 reaches the value of the direct current source 82 or until some component in the circuit tends to saturate. The capacitor 94 cannot sustain a non-changing potential across the emitter E which is greater than the voltage across the tapped resistor 91, and, therefore, the potential across the emitter E starts to fall.

The fall in potential across the emitter E is reinforced through the coupling capacitor 94 by the resulting fall in voltage across the resistor 93 until the potential across the emitter E tends to go negative. The potential across the emitter E cannot remain at zero since the voltage applied to the emitter E from the tapped resistor 91 will tend to pull it back up. The cycle then repeats.

Figure 8:
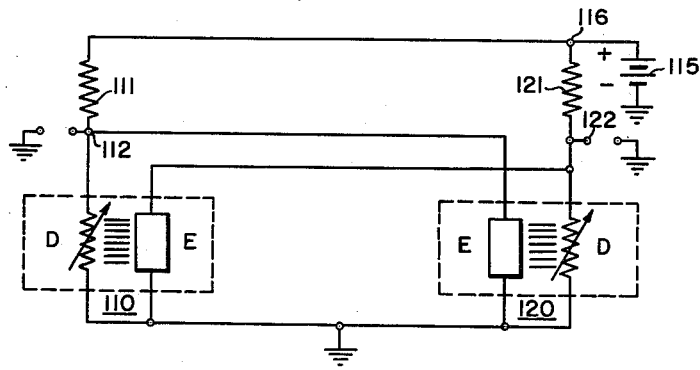
FIG. 8 is a schematic diagram illustrating a sixth embodiment of the teachings of this invention.

Referring to FIG. 8, there is illustrated a schematic diagram of a bistable multivibrator, utilizing the solid state control elements 110 and 120, embodying the teachings of this invention. A resistor 111, a terminal 112, and the detector D of the first control element 110 are connected in parallel circuit relationship with a resistor 121, a terminal 122, and the detector D of the second control element 120 between a terminal 116 and ground. An emitter E of the control element 110 is connected between the terminal 122 and ground. An emitter E of control element 120 is connected by the terminal 112 and ground. A direct-current source 115, with polarity as shown, is connected between the terminal 116 and ground.

Assume that the emitter E of the control element 110 is not radiating. Then the detector D of the control element 110 has a high resistance so that nearly all of the potential supplied by the direct-current source 115 appears across the emitter E of the control element 120 from the terminal 116 and through the resistor 111. This potential causes the emitter E of the control element 120 to radiate and also keeps it radiating.

As long as the emitter E of the control element 120 is radiating, the detector D of the control element 120 is conducting and the voltage drop across the detector D of the control element 120 will be very small. Since the emitter E of the control element 110 is connected across the detector D of the control element 120 and ground, the voltage across the emitter E of the control element 110 will be small and the emitter E will not radiate the detector D of the control element 110.

If a negative trigger pulse is injected at the terminal 112 the voltage across the emitter E of the control element 120 will drop thereby reducing the radiation to the detector D of the element 120. The resistance of the detector D of the control element 120 will rise and thus cause the voltage drop across the detector D of the control element 120 to rise. Since the emitter E of the control element 110 is connected across the detector D of the control element 120, the voltage across the emitter E of the control element 110 will also rise causing it to irradiate the detector D of the control element 110. The resistance of the detector D of the control element 110 will decrease, the detector D of the control element 110 will start to conduct and the voltage drop across the detector D of the control element 120 will fall. This fall in the voltage drop across the detector D of the control element 110 in turn reduces the voltage supply to emitter E of the control element 120, thereby reducing the radiation to detector D of the control element 120. This, in turn, raises the voltage across the emitter E of the control element 110.

As can be seen, the action will continue until the circuit illustrated in FIG. 8 assumes the alternate stable state of the detector D of the control element 110 conducting and the detector D of the control element 120 non-conducting. A negative trigger pulse of the proper magnitude injected at the terminal 122 will cause the apparatus illustrated in FIG. 8 to revert to its original state. A positive trigger pulse may be used for triggering if it is applied to the emitter E of the non-conducting control element. The positive trigger pulse will then change the circuit to its alternate stable state.

It is to be noted that the apparatus illustrated in FIG. 8 may also be triggered optically. For example, light or radiation valve means optically disposed between the emitter E and the detector D of each control element may be used to reduce the effect of the emitter E irradiating the detector D and the circuit will change to its alternate stable state.

Figure 9:
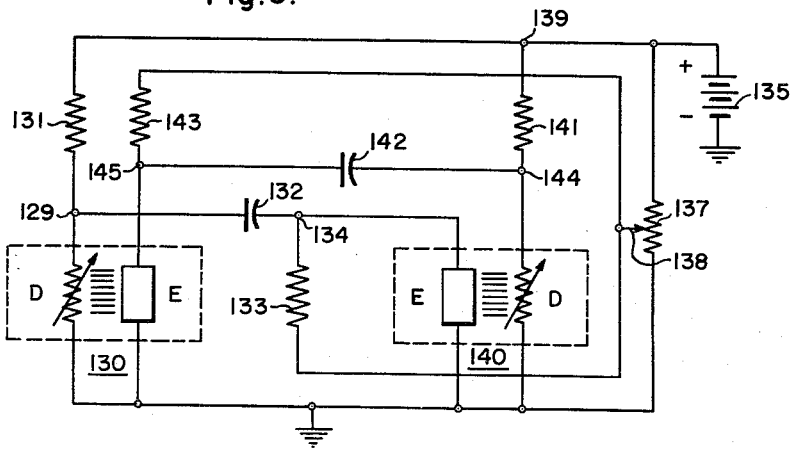
FIG. 9 is a schematic diagram illustrating a seventh embodiment of the teachings of this invention.

Referring to FIG. 9 there is illustrated a schematic diagram of a cross-coupled multivibrator, utilizing first and second solid state control elements 130 and 140, embodying the teachings of this invention.

A resistor 131, a terminal 129, and a detector D of the control element 130 are connected in parallel circuit relationship with a resistor 141, a terminal 144, and the detector D of the control element 140 between a terminal 139 and ground. A coupling capacitor 142, a terminal 145, and an emitter E of the control element 130 are connected in series circuit relationship between the terminal 144 and ground. A coupling capacitor 132, a terminal 134 and an emitter E of the control element 140 are connected in series circuit relationship between the terminal 129 and ground. A resistor 143 is connected in series circuit relationship between the terminal 145 and a tap 138 of an adjustable tapped resistor or potentiometer 137. A resistor 133 is connected in series circuit relationship between the terminal 134 and the tap 138 of the adjustable tapped resistor 137. The tapped adjustable resistor 137 and the direct current source 135, with polarity as shown, are connected in parallel circuit relationship between the terminal 139 and ground.

To explain the operation of the apparatus illustrated in FIG. 9, we will assume that the excitation, or the potential across the emitter E of the control element 130 is decreasing. Therefore, the voltage across the detector D of the control element 130 is increasing towards the potential of the direct current source 135 connected to the terminal 139. Because of the effect of the capacitor 132, when the potential rises across the detector D of the control element 130, the potential will also rise across the emitter E of the control element 140. Thus, the voltage across the detector D of the control element 140 decreases and this voltage decrease is reflected across the emitter E of the control element 130, by the action of the capacitor 142, which reinforces the decreasing action of the capacitor 142, which reinforces the decreasing action of the voltage across the emitter E of the control element 130. Finally, the voltage across the detector D of the control element 130 will reach the potential of the direct current source 135 and can increase no further. Thus the voltage across the emitter E of the control element 140 will start to decrease causing the voltage across the detector D of the control element 140 to increase and, through the action of the capacitor 142, will start to increase the voltage across the emitter E of the control element 130. The voltage across the detector D of the control element 130 will now start to decrease and this will be reflected across the emitter E of the control element 140 by the action of the capacitor 132, lowering the potential across the emitter E of the control element 140 further. The voltage across the detector D of the control element 130 will eventually rise to the potential of the direct current supply 135 at which time the cycle is completed and starts again.

Figure 10:
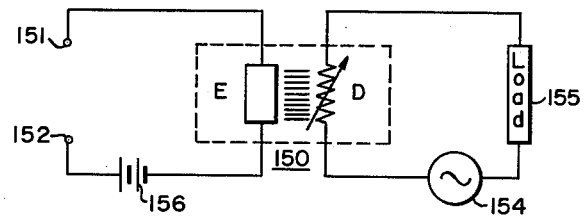
FIG. 10 is a schematic diagram illustrating an eighth embodiment of the teachings of this invention.

Referring to FIG. 10, there is illustrated a schematic diagram of a power modulator, utilizing a Type I-A control element 150, embodying the teachings of this invention. An emitter E of a control element 150 is connected in series circuit relationship between a pair of terminals 151 and 152. A detector D of the control element 150 is connected in series circuit relationship with a load 155 and a means for applying a carrier 154. From the description hereinbefore of the Type I-A control element, it may be seen that the carrier 154 amplitude across the load 155 will vary in accordance with the direct current signal input applied to the terminals 151 and 152. If so desired, a direct-current bias source 156 may be inserted in series in the input circuit to establish a desired amplitude level.

Figure 11:
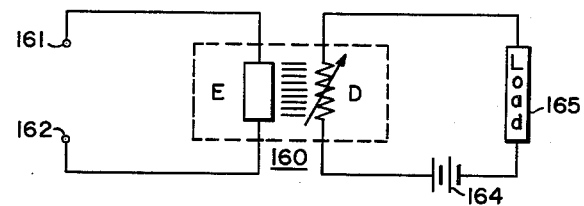
FIG. 11 is a schematic diagram illustrating a ninth embodiment of the teachings of this invention.

Referring to FIG. 11, there is shown a schematic diagram of a demodulator circuit utilizing a Type II–B control element 160. An emitter E of the control element 160 is connected in series circuit relationship between a pair of terminals 161 and 162. A detector D of the control element 160 is connected in series circuit relationship with a load 165 and a direct current source 164. As would be expected from the description of a Type II–B control element hereinbefore, the potential across the load 165 will vary in accordance with the amplitude of a modulated carrier signal applied at the input terminals 161 and 162.

Figure 12:
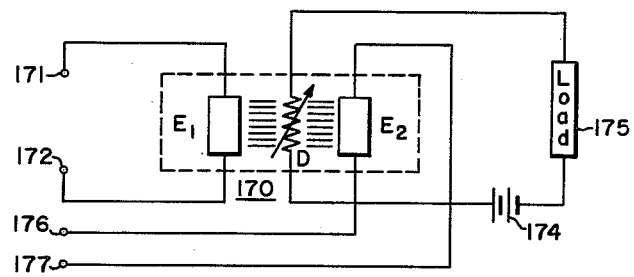
FIG. 12 is a schematic diagram illustrating a tenth embodiment of the teachings of this invention.

Referring to FIG. 12, there is shown a control element 170 having two Type I electroluminescent cells $E_1$ and $E_2$ radiating a single Type A photoconductor. The Type II emitter may be used in combination with the Type A or B detectors in a similar embodiment. The control element 170 is illustrated in a schematic diagram of a summation amplifier embodying the teachings of the invention.

The emitter $E_1$ of the control element 170 is connected in series circuit relationship between the terminals 171 and 172. The emitter $E_2$ of the control element 170 is connected between the terminals 176 and 177. The detector D of the control element 170 is connected in series circuit relationship with the load 175 and a direct current source 174. The intensity of the radiation from the emitters $E_1$ and $E_2$ falling upon detector D is proportional to the sum of the outputs from each of the electroluminescent cells. It is possible to select parameters so that the output signal across the load 175 is proportional to the sum of the input signals applied to the input terminals 171, 172 and 176, 177. In this manner a plurality of emitters may radiate one detector or a plurality of detectors may be radiated by one emitter performing a function analogous to multipole-multicoil relays.

Figure 13:
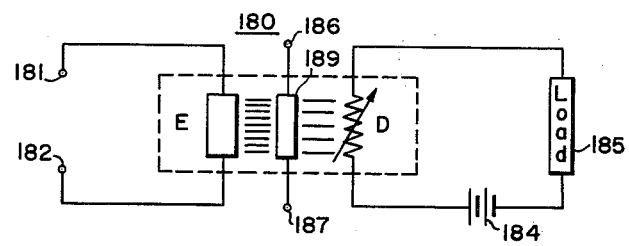
FIG. 13 is a schematic diagram illustrating an eleventh embodiment of the teachings of this invention.

Referring to FIG. 13, there is illustrated a schematic diagram of a gating amplifier embodying the teachings of this invention. A radiation valve 189 has been added between an emitter E and a detector D of a control element 180. The emitter E is connected between a pair of terminals 181 and 182. The radiation valve 189 is connected between a pair of terminals 186 and 187. The detector D of the control element 180 is connected in series circuit relationship with a direct current source 184 and a load 185. The radiation valve 189 may be a crystal with voltage variable birefringence placed between polarizing sheets, or may be any element with radiation attenuation characteristics that are changed by an electrical signal.

Without the radiation valve 189 the operation of the apparatus illustrated in FIG. 13 is the same as the operation of the apparatus illustrated in FIG. 3. However, the addition of the radiation valve gives us a means of gating the amplifier, that is, an input may be present in the terminals 181 and 182, but will not change the resistance of the detector D in the load circuit until an input appears at the terminals 186 and 187 and causes the radiation valve to be operative to pass radiation emitted by the emitter E of the control element 180.

Since the gain of the amplifier illustrated in FIG. 13 may be varied by the signal applied to the terminals 186 and 187 of the radiation valve, the circuit may be adapted to provide an output which is a product of two input signals.

The control elements and control apparatus illustrated in the foregoing embodiments have exhibited the following advantages. There is an excellent electrical isolation between the load and control terminals. Complete control of load circuit conditions is very good since the conductivity of the detectors in the load circuit may be varied by a factor of $10^5$ or more. This manner of control exhibits a sharp cutoff characteristic. This method of control is suitable for handling useful amounts of power at practical impedance levels. The structure is small, rugged, easy to fabricate, and light in weight. Control devices of this sort should have a long life and require no maintenance.

The control device may be manufactured as a packaged-encapsulated unit as a general circuit component in a wide variety of sizes and having a wide variety of applications.

In conclusion, it is pointed out that while the illustrated examples constitute practical embodiments of my invention, I do not limit myself to the exact details shown, since modifications of the same may be varied without departing from the spirit of this invention.

I claim as my invention:

1. In a control apparatus, in combination, first and second control elements, each said control element comprising an electroradiative transducer having control terminals and a radiation sensitive device having load terminals, means for connecting a direct current source to a parallel circuit having two branches, each of said branches comprising said radiation sensitive device of one of said control elements and a resistive means, said electroradiative transducer of said first control element being connected across said radiation sensitive device of said second control element, said electroradiative transducer of said second control element being connected across said radiation sensitive device of said first control element, and means for applying an electrical pulse to each said parallel branch, whereby one of said radiation sensitive devices of one of said control elements is stopped from conducting and said radiation sensitive device of the other said control element starts conducting.

2. In a control apparatus, in combination, first and second control elements, each said control element comprising an electroradiative transducer having control terminals and a radiation sensitive device having load terminals, means for connecting a direct current source to a parallel circuit having two branches, each of said branches comprising said radiation sensitive device of one of said control elements and a resistive means, said electroradiative transducer of said first control element being connected across said radiation sensitive device of said second control element, said electroradiative transducer of said second control element being connected across said radiation sensitive device of said first control element, and means for applying an electrical pulse to the junction of said radiation sensitive device and said resistive means of each said parallel branch whereby one of said radiation sensitive devices of one of said control elements is stopped from conducting and said radiation sensitive device of the other said control element starts conducting.

3. In a control apparatus, in combination, first and second control elements, each said control element comprising an electroluminescent cell having control terminals and a photoconductor having load terminals, means for connecting a direct current source to a parallel circuit having two branches, each of said branches comprising said electroluminescent cell of one of said control elements and a resistive means, said electroluminescent cell of said first control element being connected across said photoconductor of said second control element, said electroluminescent cell of said second control element being connected across said photoconductor of said first control element, and means for applying an electrical pulse to the junction of said photoconductor and said resistive means of each said parallel branch whereby one of said photoconductor of one of said control elements is stopped from conducting and said photoconductor of the other said control element starts conducting.

4. In a control apparatus, in combination, first and second control elements, each said control element comprising an electroradiative transducer having control terminals and a radiation sensitive device having load terminals, means for connecting a direct current source to a parallel circuit having two branches, each of said branches comprising said radiation sensitive device of one of said control elements and a resistive means, circuit means connecting a coupling capacitor and said electroradiative transducer of each said control element across said radiation sensitive device of the other said control element, and means for applying a direct current voltage to said electroradiative transducer of said first and second control elements.

5. In a control apparatus, in combination, first and second control elements, each said control element comprising an electroradiative transducer having control terminals and a radiation sensitive device having load terminals, means for connecting a direct current source to a parallel circuit having two branches, each of said branches comprising said radiation sensitive device of one of said control elements and a resistive means, circuit means connecting a coupling capacitor and said electroradiative transducer of each said control element across said radiation sensitive device of the other said control element, and potentiometer means for applying a direct current voltage through current limiting means to said electroradiative transducers of said first and second control elements.

6. In a control apparatus, in combination, first and second control elements, each said control element comprising an electroradiative transducer having control terminals and a radiation sensitive device having load terminals, means for connecting a direct current source to a parallel circuit having two branches, each of said branches comprising said radiation sensitive device of one of said control elements and a resistive means; and switching means operatively connected to each parallel branch to permit the radiation sensitive device one of said control elements to conduct while prohibiting the radiation sensitive device of the other said control elements from conducting.

7. In a control apparatus, in combination, first and second control elements, each said control element comprising an electroluminescent cell having control terminals and a photoconductor having load terminals, means for connecting a direct current source to a parallel circuit having two branches, each of said branches comprising said photoconductor of one of said control elements and a resistive means, circuit means connecting a coupling capacitor and said electroluminescent cell of each said control element across said photoconductor of the other said control element, and potentiometer means for applying a direct current voltage through current limiting means to said electroluminescent cell of said first and second control elements.

References Cited by the Examiner
UNITED STATES PATENTS

| | | | |
|---|---|---|---|
| 2,904,696 | 9/59 | Elliott et al. | 307—88.5 |
| 2,947,874 | 8/60 | Tomlinson | 307—88.5 |
| 2,975,290 | 3/61 | Spitzer | 331—107 |

OTHER REFERENCES

Journal British I.R.E., March 1957, pages 141–154, "Principles of the Light-Amplifier and Allied Devices," Tomlinson (only pages 149, 150 relied upon).

ROY LAKE, *Primary Examiner.*